(12) United States Patent
Jeffries et al.

(10) Patent No.: US 8,689,015 B2
(45) Date of Patent: Apr. 1, 2014

(54) PORTABLE SECURE DATA FILES

(71) Applicant: Microsoft Corporation, Redmond, WA (US)

(72) Inventors: Charles G. Jeffries, Sammamish, WA (US); Vijay G. Bharadwaj, Redmond, WA (US); Michael J. Grass, Sammamish, WA (US); Matthew C. Setzer, Woodinville, WA (US); Gaurav Sinha, Hyderabad (IN); Carl M. Ellison, New York, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/743,190

(22) Filed: Jan. 16, 2013

(65) Prior Publication Data

US 2013/0145178 A1    Jun. 6, 2013

Related U.S. Application Data (63) Continuation of application No. 12/404,007, filed on Mar. 13, 2009, now Pat. No. 8,364,984.

(51) Int. Cl.
  *H04L 29/06* (2006.01)
(52) U.S. Cl.
  USPC .......................................................... 713/193
(58) Field of Classification Search
  USPC .......................................................... 713/193
  See application file for complete search history.

(56) References Cited

U.S. PATENT DOCUMENTS

| | | | |
|---|---|---|---|
| 6,148,342 A | 11/2000 | Ho | |
| 6,226,618 B1 | 5/2001 | Downs et al. | |
| 6,249,866 B1 | 6/2001 | Brundrett et al. | |
| 6,363,488 B1 | 3/2002 | Ginter et al. | |
| 6,430,292 B1 * | 8/2002 | Ito et al. | 380/280 |
| 6,678,828 B1 | 1/2004 | Pham et al. | |
| 6,697,944 B1 | 2/2004 | Jones et al. | |
| 6,931,530 B2 | 8/2005 | Pham et al. | |
| 7,110,982 B2 | 9/2006 | Feldman | |
| 7,155,415 B2 | 12/2006 | Russell et al. | |

(Continued)

FOREIGN PATENT DOCUMENTS

| WO | WO-2007001329 | 1/2007 |
|---|---|---|
| WO | WO-2007127349 | 11/2007 |

OTHER PUBLICATIONS

"20 Database Security", Retrieved from: <http://www.stanford.edu/dept/itss/docs/oracle/10g/server.101/b10743/security.htm> Dec. 15, 2008, Oracle® Database Concepts, 10g Release 1 (10.1),(Dec. 2003), 28 pages.

(Continued)

*Primary Examiner* — Michael S McNally
(74) *Attorney, Agent, or Firm* — Tony Azure; Andrew Sanders; Micky Minhas (57) ABSTRACT

A portable secure data file includes an encrypted data portion and a metadata portion. When a request associated with a current user of a device to access a portable secure data file is received, one or more records in the metadata portion are accessed to determine whether the current user is permitted to access the file data in the encrypted data portion. If a record indicates the user is permitted to access the file data, a content encryption key in that record is used to decrypt the encrypted data portion.

20 Claims, 8 Drawing Sheets

(56) References Cited

U.S. PATENT DOCUMENTS

| | | |
|---|---|---|
| 7,213,005 B2 | 5/2007 | Mourad et al. |
| 7,213,266 B1 | 5/2007 | Maher et al. |
| 7,272,723 B1 | 9/2007 | Abbott |
| 7,305,562 B1 | 12/2007 | Bianco |
| 7,406,603 B1 | 7/2008 | MacKay et al. |
| 7,509,492 B2 | 3/2009 | Boyen et al. |
| 7,792,301 B2 | 9/2010 | Bharadwaj et al. |
| 8,176,334 B2 * | 5/2012 | Vainstein ............ 713/189 |
| 8,364,984 B2 | 1/2013 | Jeffries et al. |
| 2002/0019935 A1 | 2/2002 | Andrew et al. |
| 2002/0077985 A1 | 6/2002 | Kobata et al. |
| 2002/0141574 A1 | 10/2002 | Henson et al. |
| 2002/0147929 A1 | 10/2002 | Rose |
| 2002/0194484 A1 * | 12/2002 | Bolosky et al. ............ 713/189 |
| 2003/0046366 A1 | 3/2003 | Pardikar et al. |
| 2003/0105950 A1 | 6/2003 | Hirano et al. |
| 2003/0110397 A1 | 6/2003 | Supramaniam et al. |
| 2003/0196114 A1 * | 10/2003 | Brew et al. ............ 713/201 |
| 2004/0039926 A1 | 2/2004 | Lambert |
| 2004/0064710 A1 | 4/2004 | Vainstein et al. |
| 2004/0117489 A1 | 6/2004 | Harmon et al. |
| 2004/0128498 A1 | 7/2004 | Lang |
| 2005/0039034 A1 | 2/2005 | Doyle et al. |
| 2006/0018484 A1 | 1/2006 | Yoshihiro et al. |
| 2006/0218650 A1 | 9/2006 | Costa-Requena et al. |
| 2007/0266252 A1 | 11/2007 | Davis et al. |
| 2008/0034205 A1 | 2/2008 | Alain et al. |
| 2008/0173709 A1 | 7/2008 | Ghosh |
| 2008/0181412 A1 | 7/2008 | Acar et al. |
| 2008/0216169 A1 | 9/2008 | Naizhen et al. |
| 2008/0244691 A1 | 10/2008 | Hilerio et al. |
| 2009/0070580 A1 | 3/2009 | Cobelo et al. |
| 2010/0235649 A1 | 9/2010 | Jeffries et al. |
| 2010/0299762 A1 | 11/2010 | Jouret et al. |

OTHER PUBLICATIONS

"Encrypting File System in Windows XP and Windows .NET server", *Microsoft Corporation*, Aug. 2002, pp. 1-59.

"Final Office Action", U.S. Appl. No. 11/427,660, (Feb. 3, 2010), 12 pages.

"Final Office Action", U.S. Appl. No. 12/404,007, (Nov. 23, 2011), 29 pages.

"Non Final Office Action", U.S. Appl. No. 11/427,660, (Nov. 4, 2009), 7 pages.

"Non-Final Office Action", U.S. Appl. No. 12/404,007, (Apr. 11, 2012), 40 pages.

"Non-Final Office Action", U.S. Appl. No. 12/404,007, (Jul. 20, 2011), 28 pages.

"Notice of Allowance", U.S. Appl. No. 11/427,660, (May 7, 2010), 11 pages.

"Notice of Allowance", U.S. Appl. No. 12/404,007, (Sep. 21, 2012), 10 pages.

"Restriction Requirement", U.S. Appl. No. 11/427,660, (Sep. 2, 2009), 6 pages.

"Web Security, Restricted Access, and Bluestem", Retrieved from <http://www.uic.edu/depts/accc/webpub/security/intro.html> on Dec. 15, 2008, (Nov. 17, 2008), 3 pages.

Bharadwaj, Vijay G., et al., "Towards Automated Negotiation of Access Control Policies", *In Proceedings of POLICY 2003*, Available at <http://citeseerx.ist.psu.edu/viewdoc/download?doi=10.1.1.9.6765&rep=rep1&type=pdf>,(Mar. 1, 2010), 9 pages.

Hicks, John "Cryptography in SQL Server", Retrieved from: <http://msdn.microsoft.com/en-us/library/cc837966%28SQL.100%29.aspx> on Oct. 18, 2010, (Jul. 2008), 18 pages.

Linn, John et al., "Attribute Certification: An Enabling Technology for Delegation and Role-Based Controls in Distributed Environments", *In Proceedings of RBAC 1999*, Available at <https://www.infosecurity.org.cn/content/pki_pmi/dist_use_pmi.pdf>,(Oct. 1999), pp. 121-130.

Marks, Howard "Using Win2000's Foolproof Encryption", *Network Computing*, www.networkcomputing.com, (Oct. 30, 2000), pp. 156-158.

Opplinger, Rolf et al., "A Distributed Certificate Management System (DCMS) Supporting Group based access controls", *In Proceedings of ACSAC 1999*, Available at <http://citeseerx.ist.psu.edu/viewdoc/download?doi=10.1.1.97.5300&rep=rep1&type=pdf> ,(1999), 8 pages.

Tang, Qiang "On Using Encryption Techniques to Enhance Sticky Policies Enforcement", *Technical Report TR-CTIT-08-64*, Available at<http://eprints.eemcs.utwente.nl/14262/01/On_Using_Encryption_Techniques_to_Enhance_Sticky_Policies_Enforcement.pdf>,(2008), pp. 1-21.

Wolthusen, Stephen D., "Security Policy Enforcement at the File System Level in the Windows NT Operating System Family", 0-7695-1405, *2001 IEEE*, (Jul. 2001), pp. 55-63.

\* cited by examiner

PORTABLE SECURE DATA FILES

RELATED APPLICATION

This application is a Continuation of and claims priority to co-pending application Ser. No. 12/404,007, filed on Mar. 13, 2009, entitled "Portable Secure Data Files", incorporated herein by reference.

BACKGROUND

As computers have become increasingly commonplace, the amount of data that is stored and/or transferred electronically has also increased. Some data can be made publicly available, while it is desirable to protect other data so that it is accessible to only select users. One mechanism for protecting data is to have the operating system of the computer restrict which users can access the data. However, this can be problematic as this protection is typically limited to accesses to the data from that computer. When the data is transferred to another computer, the protection is typically lost.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a request associated with a current user of a device to access a portable secure data file including an encrypted data portion and a metadata portion is received. A service record in the metadata portion is accessed, and a remote service associated with that service record is also accessed. An indication of whether a current user of the device can access the encrypted data portion is received from the remote service.

In accordance with one or more aspects, a portable secure data file including an encrypted data portion and a metadata portion is obtained. An identification is made as to whether a record in the metadata portion permits a user of the computing device to decrypt both the encrypted data portion and an encrypted access control policy in the metadata portion. The user is allowed to have a desired access privilege to the encrypted data portion only if the record is present in the metadata portion and the encrypted access control policy indicates that the user is to have that access privilege to the encrypted data portion.

In accordance with one or more aspects, a request to create a portable secure data file including a metadata portion and a data portion is received. Encrypted data of the portable secure data file is stored in the data portion, the encrypted data having been encrypted using a content encryption key. In the metadata portion, an encrypted access control policy, a signature record, and one or more other records are stored. The access control policy identifies types of access one or more users are permitted to have to the portable secure data file, the access control policy having been encrypted using a policy encryption key. The signature record affirms the integrity of the portable secure data file. The one or more other records each includes both the policy encryption key and the content encryption key, and each identifies one or more users that are permitted to decrypt both the encrypted policy encryption key and the encrypted content encryption key.

BRIEF DESCRIPTION OF THE DRAWINGS

The same numbers are used throughout the drawings to reference like features.

DETAILED DESCRIPTION

Portable secure data files are discussed herein. Each portable secure data file is stored as a data file container that includes a data portion and a metadata portion. In the data portion, the file data in encrypted form is stored. In the metadata portion, various information describing the data file container and one or more users that are permitted to access the file data is stored. This information includes one or more records identifying one or more users, and/or one or more user groups, that have access to the data, each of the records being encrypted in a manner such that only the one or more users for which the record is intended can access the decrypted record. This information also includes an encrypted access control policy used to determine what type of access those users have to the data. Each of the one or more records includes a content encryption key that can be used to decrypt the encrypted data in the data portion, and a policy encryption key that can be used to decrypt the encrypted access control policy.

Figure 1:
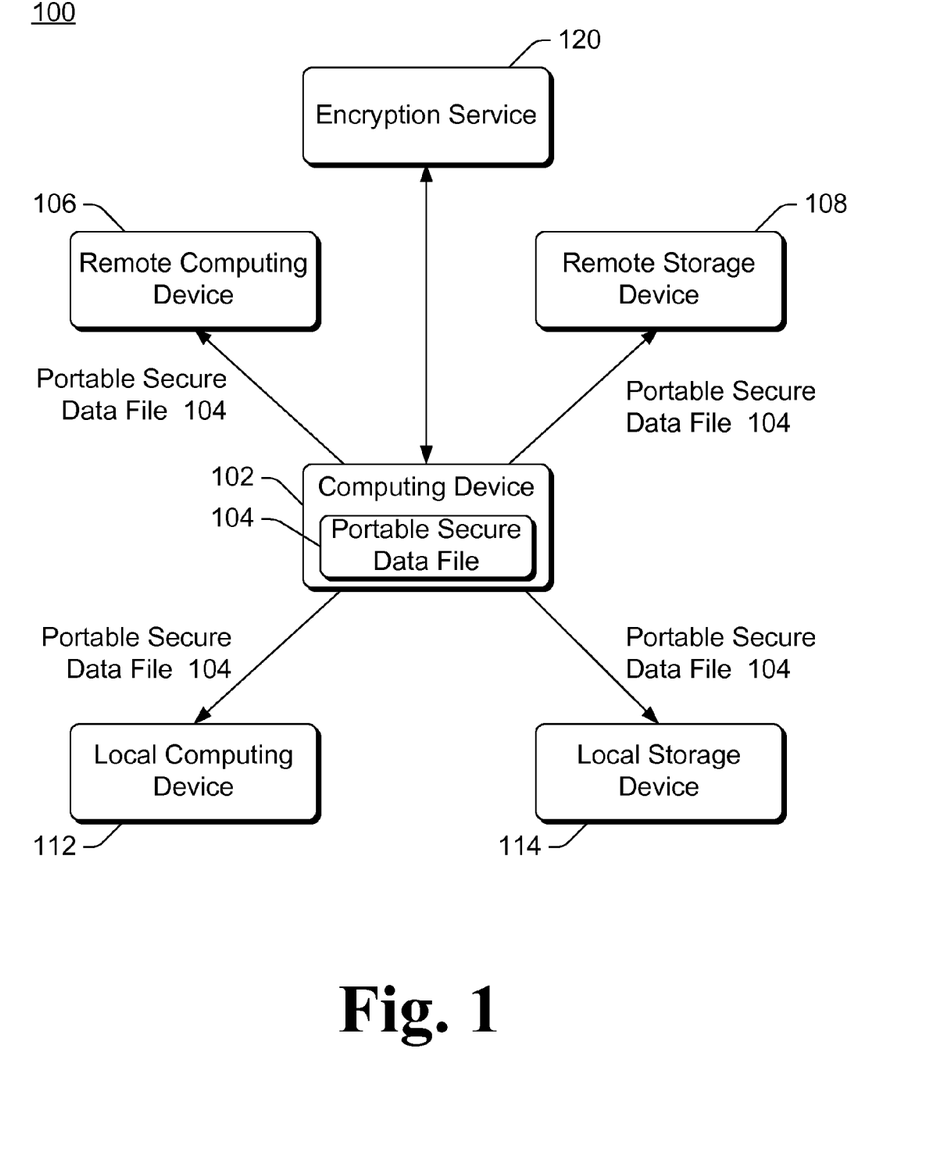
FIG. 1 illustrates an example system implementing portable secure data files in accordance with one or more embodiments.

FIG. 1 illustrates an example system 100 implementing portable secure data files in accordance with one or more embodiments. System 100 includes a computing device 102 having a portable secure data file 104. Portable secure data file 104 is a data file container that includes a data portion and a metadata portion, as discussed in more detail below. Portable secure data file 104 can be generated at computing device 102, or alternatively can be received by computing device 102 from some other device. Although computing device 102 is illustrated as having one portable secure data file 104, it is to be appreciated that device 102 can include multiple portable secure data files.

Computing device 102 can be a variety of different devices capable of generating and/or accessing data files. For example, computing device 102 can be a desktop computer, a mobile station, an entertainment appliance, a set-top box communicatively coupled to a display device, a cellular or other wireless phone, a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, handheld game consoles).

Computing device 102 can communicate with a remote computing device 106 and/or a remote storage device 108 via a network. Remote computing device 106 can be a variety of different types of devices, analogous to the discussion of computing device 102 above. Remote computing device 106 can be the same or a different type of device as computing device 102. Remote storage device 108 is a storage device that can store data files, such as a file server, a file storage service, and so forth. Although only one remote computing device and one remote storage device are illustrated in FIG. 1, it is to be appreciated that computing device 102 can communicate with multiple remote computing devices 106 and/or multiple remote storage devices 108. Remote devices 106 and 108 are typically located in a different physical location than device 102 (e.g., a different office, a different building, a different country, etc.). Computing device 102 can communicate with devices 106 and 108 via a variety of different networks, including the Internet, a local area network (LAN), a public telephone network, an intranet, other public and/or proprietary networks, combinations thereof, and so forth.

Computing device 102 can also communicate with a local computing device 112 and/or a local storage device 114. Local computing device 112 can be a variety of different types of devices, analogous to the discussion of computing device 102 above. Local computing device 112 can be the same or a different type of device as computing device 102. Local storage device 114 is a storage device that can store data files, such as a magnetic disk, an optical disc, a flash memory device, and so forth. Although only one local computing device and one local storage device are illustrated in FIG. 1, it is to be appreciated that computing device 102 can communicate with multiple local computing devices 112 and/or multiple local storage devices 114. Local devices 112 and 114 are typically located in the same physical location as device 102. Computing device 102 can communicate with devices 112 and 114 via a variety of different wired and/or wireless connections, such as a universal serial bus (USB) connection, a wireless USB connection, an IEEE 1394 connection, a Bluetooth connection, an infrared connection, and so forth.

Computing device 102 also optionally communicates via a network to a remote encryption service 120. Encryption service 120 can be implemented by one or more servers or other computing devices. Analogous to remote devices 106 and 108, remote encryption service 120 is typically located in a different physical location than device 102 (e.g., a different office, a different building, a different country, etc.), and the communication can occur over a variety of different networks, as discussed above. Encryption service 120 is a trusted third party decryption service that can optionally be used by one or more of devices 102, 106, 108, 112, and 114 to decrypt and/or encrypt portable secure data file 104. Whether encryption service 120 is used by a particular device to decrypt file 104 is determined based at least in part on the information in the metadata portion of file 104, as discussed in more detail below.

As shown in FIG. 1, portable secure data file 104 can be transferred to one or more of devices 106, 108, 112, and 114. Each of these devices 106, 108, 112, and 114 can further transfer portable secure data file 104 to one or more other devices, which can in turn transfer portable secure data file 104 to one or more additional devices, and so forth. When transferring portable secure data file 104, the device transferring file 104 can keep a copy of file 104, or alternatively can delete its copy of file 104. Different copies of portable secure data file 104 can be maintained at multiple different devices and accessed by those different devices concurrently. The information used by the various devices to determine if a user of the device can access the data in file 104 is stored in portable secure data file 104. Accordingly, this information transfers with file 104 as it is transferred to different devices.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by comparing a verification value obtained using the public key with the received data, and if the two are the same then be assured that no one has tampered with or altered the data that was digitally signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. Additionally, a digital Message Authentication Code (MAC) can be generated using the data and the shared key. Any entity having the shared key can use it to verify the MAC by comparing a verification value obtained using the shared key with the received data, and if the two are the same then be assured that no one has tampered with or altered the data that was authenticated by the MAC. So, if two entities both know the shared key, each can encrypt data that can be decrypted by the other and generate MACs that can be verified by the other, but other entities cannot decrypt the data or verify the MACs if the other entities do not know the shared key.

Figure 2:
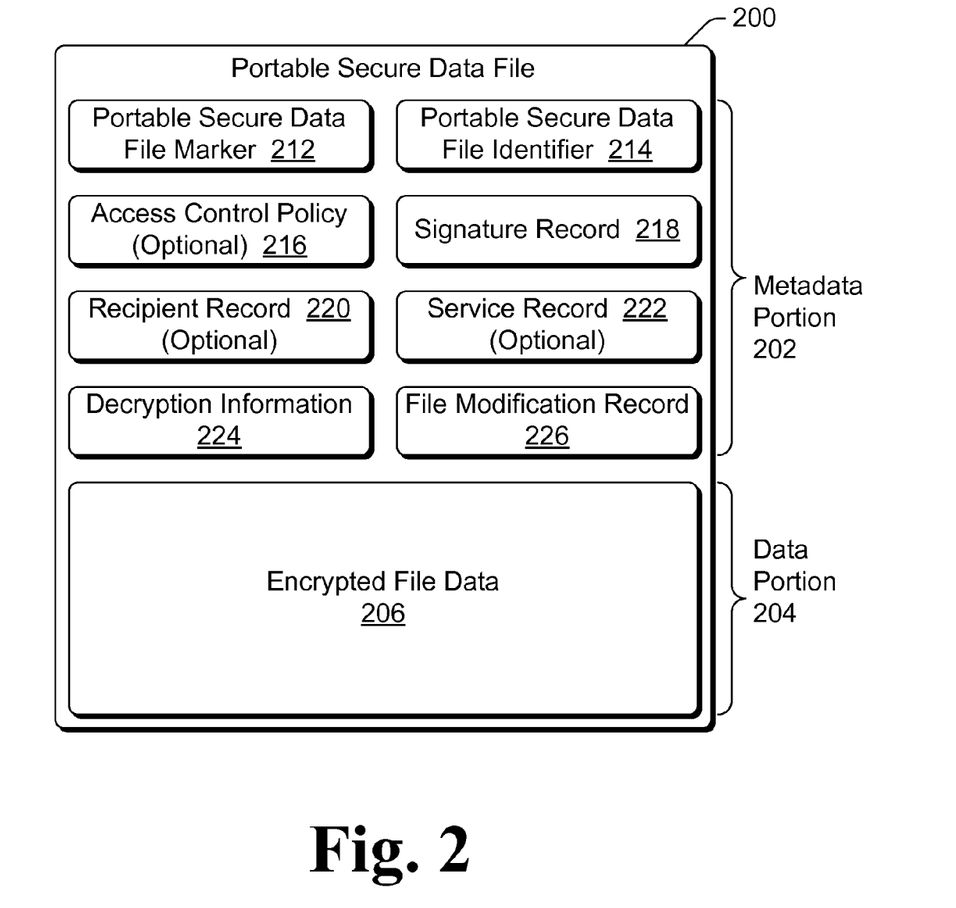
FIG. 2 illustrates an example portable secure data file in accordance with one or more embodiments.

FIG. 2 illustrates an example portable secure data file 200 in accordance with one or more embodiments. Portable secure data file 200 can be, for example, a portable secure data file 104 of FIG. 1. Portable secure data file 200 can also be referred to as a data file container.

Portable secure data file 200 includes a metadata portion 202 and a data portion 204. Data portion 204 stores the encrypted file data 206 for the portable secure data file. The file data 206 is encrypted using symmetric key cryptography and a shared key referred to as a content encryption key that is also encrypted and stored in metadata portion 202 as discussed in more detail below. It is to be appreciated that file data 206 can be any type of data, program code, instructions, and so forth, and that file data 206 can be a single file, a portion of a file, multiple files, and so forth.

Portable secure data file 200 can be stored using a variety of different container formats. In one or more embodiments, portable secure data file 200 is stored in accordance with the well-known Open Packaging Convention (OPC) format. In other embodiments, portable secure data file 200 is stored as a compound file using the well-known Component Object Model (COM) framework. Alternatively, other public or proprietary container formats can be used to store portable secure data file 200.

Metadata portion 202 includes one or more of a portable secure data file marker 212, a data file identifier 214, an access control policy 216, a signature record 218, a recipient record 220, a service record 222, decryption information 224, and file modification record 226.

Portable secure data file marker 212 is a sequence of characters, symbols, or other values that is used to identify file 200 as a portable secure data file. A variety of different sequences can be used, although the particular sequence that is used is selected so as to be unlikely to occur at the same location in other files as marker 212 occurs in file 200. In one or more embodiments, marker 212 is located in the beginning of file 200 although marker 212 can alternatively be located in different locations in file 200. Marker 212 identifies file 200 to a file system or operating system as being a portable secure data file, allowing the file system or operating system to manage file 200 appropriately.

Portable secure data file identifier 214 is a sequence of characters, symbols, or other values that is used to distinguish file 200 from any other portable secure data file. File identifier 214 includes both an originator identifier and a data identifier.

The originator identifier identifies the originator of portable secure data file 200. The originator refers to the owner of portable secure data file 200. In one or more embodiments, the owner of file 200 is the user that requests creation of portable secure data file 200. Alternatively, another user can be the owner of file 200, such as a corporate entity that owns the device on which file 200 is being created. It should be noted that file data 206 may be created at the time file 200 is created, or alternatively file data 206 may have been previously created and be added to data portion 204 when file 200 is created. The originator identifier can be a public key of the originator, or alternatively another identifier that identifies the originator (e.g., a globally unique id (GUID)).

The data identifier is a locally unique identifier of the data 206—other originators could use the same data identifier, but when combined with the originator identifier the data identifier allows file data 206 to be uniquely identified.

An access control policy 216 is optionally included in portable secure data file 200, and identifies the type of access different users are permitted to have to portable secure data file 200. The particular users that have access to file data 206 after it has been decrypted are identified in one or more of records 220 and 222, discussed in more detail below. In one or more embodiments, access control policy 216 is specified using the XrML (eXtensible rights Markup Language) access control language, although access control policy 216 can alternatively be specified using a variety of other public and/or proprietary access control languages. Alternatively, access control policy 216 can be omitted, and the information identifying the type of access different users are permitted to have to portable secure data file can be expressed within records 220 and 222.

Access control policy 216 is added to metadata portion 202 when portable secure data file 200 is created. The particular policy 216 included in a particular file 200 can be determined in different manners, such as based on input received from a user creating the file, based on access to one or more other files that the user creating the file has, based on access that is permitted to other files in the folder or directory where the new file is being created, and so forth.

Access control policy 216 can specify a variety of different types of access that different users can have to portable secure data file 200. Examples of such types of access include permission to read file data 206 after it has been decrypted, permission to modify file data 206 and/or access control policy 216, permission to copy file data 206 after it has been decrypted, permitting a limited number of copies of file data 206 to be printed after it has been decrypted, and so forth.

A recipient refers to any user that can access data 206. Access control policy 216 specifies for each recipient the type of access the recipient has, such as read-write access, read-only access, or other types of access as discussed above. A recipient is also able to verify that encrypted file data 206 has not been edited by a user who did not have read-write access at the time, and that access control policy 216 has not been changed by a user that was not authorized to do so at the time of the change. This verification can be performed based on the signature record 218 and/or file modification record 226, discussed in more detail below.

Access control policy 216 is encrypted using symmetric cryptography and a shared key referred to as a policy encryption key. The policy encryption key is included in each of one or more records 220 and 222, as discussed in more detail below. Accordingly, the particular users that have access to access control policy 216 are inherently identified in one or more of records 220 and 222.

Signature record 218 includes information to assist a recipient in validating that file data 206 and access control policy 216 were not modified since the signature record was created, thereby allowing the recipient to affirm the integrity of portable secure data file 200. In one or more embodiments, signature record 218 includes various pieces of information including a data signature, a policy signature and a timestamp for each of these signatures. The data signature consists of a digital signature, using a private key of the last user to create or modify file data 206, over data file identifier 214 and a cryptographic hash or MAC of file data 206. Similarly, the policy signature consists of a digital signature, using a private key of the last user to create or modify policy 216, over data file identifier 214 and a cryptographic hash or MAC of access control policy 216. In embodiments where access control policy 216 is omitted, the policy signature is also omitted.

The cryptographic hash or MAC of file data 206 can be generated using any of a variety of different conventional cryptographic hash or MAC functions. The cryptographic hash or MAC function can be applied to file data 206 before file data 206 is encrypted, or alternatively after file data 206 is encrypted. Similarly, the cryptographic hash or MAC of access control policy 216 can be generated using any of a variety of different conventional cryptographic hash or MAC functions. This cryptographic hash or MAC function can be the same function as is applied to file data 206, or alternatively a different function. The cryptographic hash or MAC function can be applied to access control policy 216 before access control policy 216 is encrypted, or alternatively after access control policy 216 is encrypted.

One or more timestamps can be included in metadata portion 202, each timestamp being an identifier of when the file data 206 or access control policy 216 was created or last modified, and allows most recent copies of records (such as signature record 218, file modification record 226, discussed below, and so forth) to be identified. The timestamp can be implemented in a variety of different manners, such as being a conventional Lamport timestamp, being a date and time the digital signature was created, and so forth.

The digital signature that is included in signature record 218 allows a subsequent user of portable secure data file 200 to verify that encrypted file data 206 and access control policy 214 have not been altered since they were digitally signed. When a subsequent user accesses portable secure data file 200, cryptographic hashes or MACs of access control policy 216 and encrypted file data 206 can be generated. Using the public key of the respective signers, the cryptographic hashes of access control policy 216 and encrypted file data 206 can be extracted from the digital signatures. If these cryptographic hashes generated by the subsequent user match (are the same as) the cryptographic hashes extracted from the digital signature, the subsequent user is assured that access control policy 216 and encrypted file data 206 have not been altered since being digitally signed. However, if these cryptographic hashes generated by the subsequent user do not match (are not the same as) the cryptographic hashes extracted from the digital signature, then the subsequent user knows that the access control policy 216 and/or encrypted file data 206 has been altered since being digitally signed and thus is not to be trusted.

It should be noted that the digital signature can be created using a public/private key pair other than the public/private key pair of the originator. However, in such situations an association between the public/private key pair used to generate the digital signature and the public/private key pair of the originator is established. This association can be established in different manners, such as a conventional certificate chain in which the public/private key pair of the originator is used to grant permission to digitally sign the record 218 to one or more other public/private key pairs, as described in more detail below.

One or more recipient records 220 are optionally included in portable secure data file 200. It should be noted, however, that some portable secure data files 200 do not include any recipient records 220. Each recipient record 220 is encrypted to the recipient associated with the record 220 using public key cryptography. This encryption is performed by encrypting the record 220 using the public key of the recipient associated with the record 220, making it computationally infeasible for users other than that recipient to decrypt the record 220. Additional information can also be stored to indicate the specific public key used for encrypting the record, for the convenience of future users.

Recipient record 220 also includes the data file identifier 214, the content encryption key, the policy encryption key, and one or more permissions corresponding to the recipient associated with record 220. Accordingly, recipient record 220 allows the recipient associated with record 220 to decrypt the content encryption key in order to decrypt encrypted file data 206. Recipient record 220 also allows the recipient associated with record 220 to decrypt the policy encryption key in order to decrypt access control policy 216.

In one or more embodiments, these permissions in recipient record 220 are in addition to the permissions included in access control policy 216. However, the permissions in record 220 apply only to the recipient associated with record 220. A variety of different types of permissions can be included in recipient record 220 analogous to those discussed above with respect to access control policy 216, such as permission for a recipient to read file data 206 after it has been decrypted, permission for a recipient to modify file data 206, and so forth. In other embodiments, the permissions in recipient record are in place of access control policy 216. Accordingly, rather than specifying in access control policy 216 the types of access that a particular recipient has, the types of access can be specified in the permissions of the recipient record 220 associated with that recipient.

The permissions in recipient record 220 can be expressed in different ways. In one or more embodiments, the permissions are specified using the XrML language or alternatively another access control language. In other embodiments, the permissions are specified as a usage certificate chain. A usage certificate is a cryptographically signed statement which associates a user with a set of access permissions such as those described in the discussion of access control policy 216, and specifies whether or not the user may delegate each of these access permissions to others. A usage certificate chain is a sequence of usage certificates, in which the first usage certificate is signed by the originator. Each subsequent certificate in a valid usage certificate chain belongs to a user to whom the owner of the previous certificate in the chain was authorized to delegate one or more access permissions.

The permissions in recipient record 220 can be specified in different manners. In one or more embodiments, the permissions in recipient record 220 are specified by the user creating the portable secure data file. Alternatively, the permissions in recipient record 220 can be specified in other manners analogous to the access control policy, such as based on access permitted to users other than the current user to other files in the folder or directory where the new file is being created, based on an access control policy for the current user of the device, and so forth.

It is to be appreciated that multiple recipient records 220, each associated with a different recipient, can be included in portable secure data file 200. Each of these multiple recipient records 220 is encrypted using the public key of the recipient associated with the record 220.

One or more service records 222 are optionally included in portable secure data file 200. It should be noted, however, that some portable secure data files 200 do not include any service records 222. Each service record 222 is encrypted to the service associated with the record 222 using public key cryptography. This encryption is performed by encrypting at least part of the record 222 using the public key of the service, making it computationally infeasible for users other than the service to decrypt the record 222. In addition to the encrypted portion, the service record 222 includes information used to identify the service, such as a Uniform Resource Locator (URL) of the service. Alternatively, the service can be identified in other manners, such as a particular one or more services being inherently associated with portable secure data file 200, in which case information used to identify the service need not be included in service record 222.

The encrypted part of service record 222 also includes data file identifier 214, the content encryption key and the policy encryption key. Accordingly, service record 222 allows the service associated with record 222 to decrypt the content encryption key in order to decrypt encrypted file data 206. Service record 222 also allows the service associated with record 222 to decrypt the policy encryption key in order to decrypt access control policy 216. In one or more embodiments, service record 222 can itself include an access control policy for the service to enforce, encrypted by the policy encryption key. This access control policy can be in addition to, or instead of, the access control policy 216, similar to the discussion of access control policies in recipient records above. In one or more embodiments, the service record 222 can also include a usage certificate chain which specifies the access permissions that the service is allowed to have and/or delegate.

Each recipient record 220 allows the associated recipient to decrypt encrypted file data 206 and access control policy 216 without accessing a remote service. Service record 222, on the other hand, is associated with a remote service that is accessed in order to decrypt encrypted file data 206 and access control policy 216. An example of such a remote service is encryption service 120 of FIG. 1. The remote service that is accessed can be one or more default services that are known to the component or module attempting to decrypt data 206 and policy 216. Alternatively, the remote service can be identified in portable secure data file 200, such as being included in service record 222 or elsewhere in metadata portion 202.

In order to decrypt data 206 and policy 216, the remote service associated with service record 222 is accessed and both service record 222 and access control policy 216 are sent to the remote service. The remote service checks whether the user requesting to access decrypted data 206 is permitted to access decrypted data 206. This check can be performed in a variety of different manners. In one or more embodiments, the remote service maintains records of which users are members of a particular group, with the members of a particular group being permitted to access particular data in accordance with the access control policy 216. These records are checked to determine whether the user requesting to access decrypted data 206 is permitted to do so.

If the remote service determines that the user requesting to access decrypted data 206 is permitted to do so then the remote service decrypts the content encryption key and the policy encryption key in service record 222. The content encryption key and the policy encryption key are returned to the device attempting to access data 206, allowing the device to decrypt encrypted file data 206 and access control policy 216. It is to be appreciated that the content encryption key in the policy encryption key can be returned to the device via a secure communication channel in order to prevent the content encryption key and the policy encryption key from being publicly accessed.

The remote service can define a group in a variety of different ways. In one or more embodiments, groups are defined based on the users being treated similarly by a network or network administrator. For example, groups can be Active Directory® directory service groups. Additional information regarding Active Directory® directory service groups is available from Microsoft Corp. of Redmond, Wash. Alternatively, the remote service can define a group using a variety of other public and/or proprietary techniques.

It is to be appreciated that multiple service records 222, each associated with a different service, can be included in portable secure data file 200. Each of these multiple service records 222 is encrypted using the public key of the service associated with the record 222.

Additionally, in one or more embodiments after the content encryption key and the policy encryption key are received from the remote service, a new recipient record 220 can be generated and stored in portable secure data file 200. This new record 220 is encrypted using the public key of the user accessing data 206. By generating a new record 220 in file 200, the next time the user attempts to access data 206 the remote service need not be accessed as the content encryption key and policy encryption key can be obtained from the new record 220. Whether such a new record 220 can be generated can optionally be included as part of access control policy 216. For example, a "service-only" flag can be included in access control policy 216 and can be set to indicate that such a new record 220 cannot be generated, and can be cleared to indicate that such a new record 220 can be generated.

Whether a recipient record 220 is to be generated after the content encryption key and the policy encryption key are received from the remote service can be identified in different manners. For example, access control policy 216 can specify whether a recipient record is to be generated for a particular group and/or for particular users, the remote service can be programmed with or otherwise configured with information or rules indicating whether a recipient record is to be generated for a particular group and/or for particular users, and so forth.

Permissions included in a recipient record generated after the content encryption key and the policy encryption key are received from the remote service can similarly be identified in different manners. For example, access control policy 214 can specify the permissions to include in a recipient record, the remote service can be programmed with or otherwise configured with information or rules indicating the permissions to include in a recipient record, and so forth.

Alternatively, rather than the remote service returning the content encryption key and the policy encryption key to the device attempting to access data 206, the remote service can generate and return a new recipient record 220 for the user of the device attempting to access data 206. This new record 220 is encrypted using the public key of the user, so a secure communication channel between the device attempting to access data 206 and the remote service need not be used. This new record 220 can optionally be stored as a new record 220 in metadata portion 202, analogous to the generation of a new record 220 discussed above.

Decryption information 224 includes additional information that can be used in decrypting encrypted file data 206 and/or access control policy 216. A variety of different information can be included in decryption information 224. For example, decryption information 224 can identify the algorithm to use to decrypt encrypted file data 206, can identify the algorithm to use to decrypt access control policy 216, can identify a service associated with service record 222, and so forth.

File modification record 226 is one or more records identifying the modified portable secure data file 200. The modifications that are made to file 200 can be made by the originator of portable secure data file 200, or alternatively modifications made by another user (e.g., an author or recipient) having permission to modify encrypted file data 206 and/or access control policy 216. Each file modification record 226 corresponds to one change or a set of consecutive changes by the same user, and can be used by a subsequent user to verify that the encrypted file data 206 and/or access control policy 214 has not been altered since the digital signature was generated. In one or more embodiments, file modification record 226 includes a data signature and/or a policy signature and a timestamps for these signatures analogous to the discussion above regarding signature record 218. In such embodiments, file modification record 226 need not be included in metadata portion 202; rather, signature record 218 can be used.

Alternatively, in embodiments that employ usage certificate chains to indicate permissions, file modification record 226 includes the usage certificate chain for the user making the modification. In one or more embodiments it may also include additional information such as the type of change made, the identifier of the device or location where the change was made and the cryptographic hash of the file data or access control policy before or after the change.

The device on which portable secure data file 200 is being modified enforces access control policy 216 (and permissions in recipient record 220) so that only users permitted to modify encrypted file data 206 and/or access control policy 216 can in fact modify encrypted filed data 206 and/or access control policy 216. Accordingly, a file modification record 226 is generated for a modification to portable secure data file 200 only if the user making the modification is permitted to do so. In one or more embodiments, the file modification record can be shortened by deleting all but the most recent record.

It should be noted that in embodiments which employ usage certificate chains, a future recipient can verify that the file data and access control policy were not modified without authorization even in the absence of such enforcement, by verifying the usage certificate chains in the file modification records 226 in conjunction with the signature record 218.

It should be noted that in one or more embodiments, records 220, and/or 222 can be also be removed from portable secure data file 200. The particular users that are permitted to remove records 220 and/or 222 can be specified in a variety of different manners, such as in access control policy 216, a permission of a recipient record 220, and so forth.

Figure 3A:
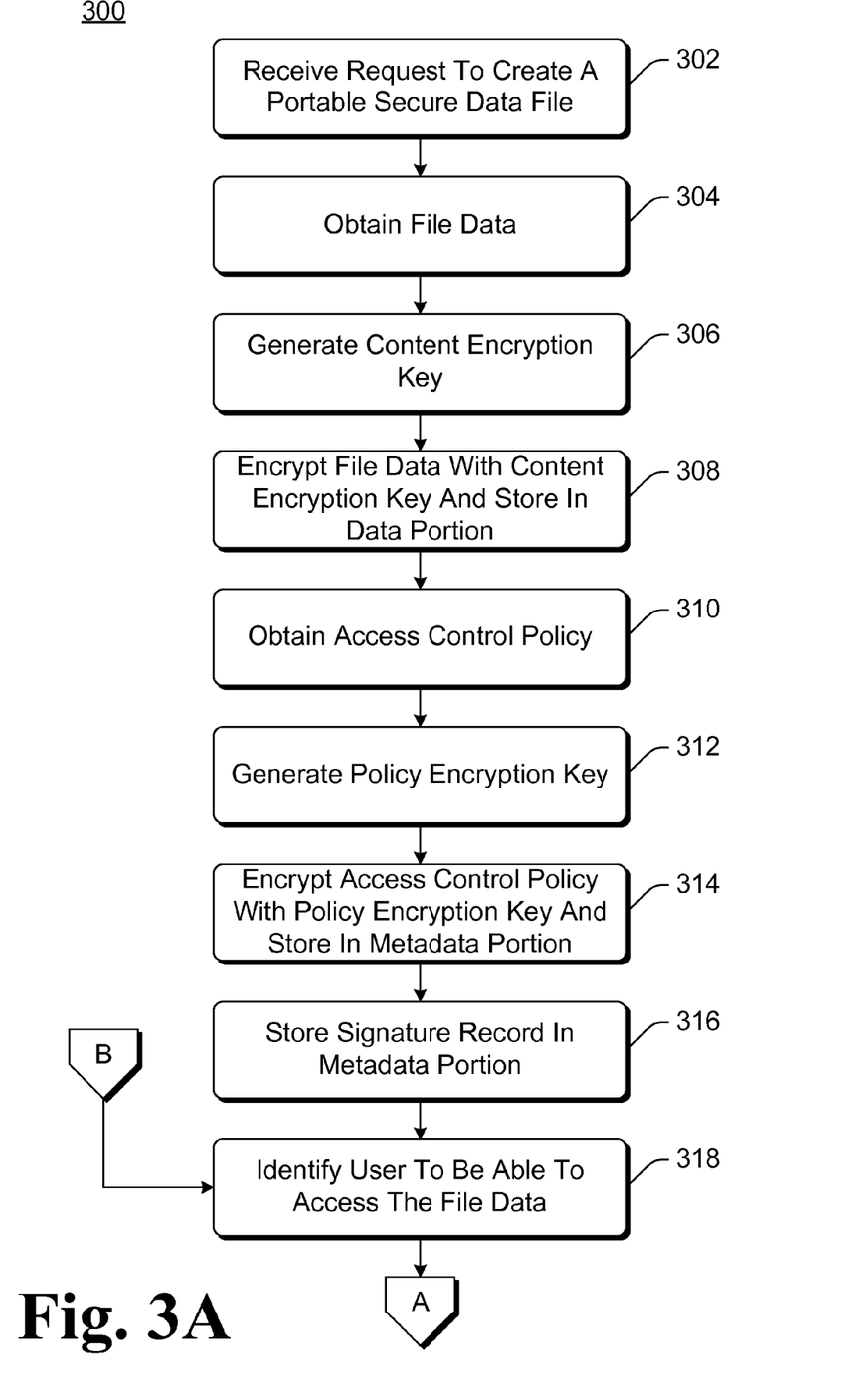
FIGS. 3A and 3B are a flowchart illustrating an example process for creating a portable secure data file in accordance with one or more embodiments.
Figure 3B:
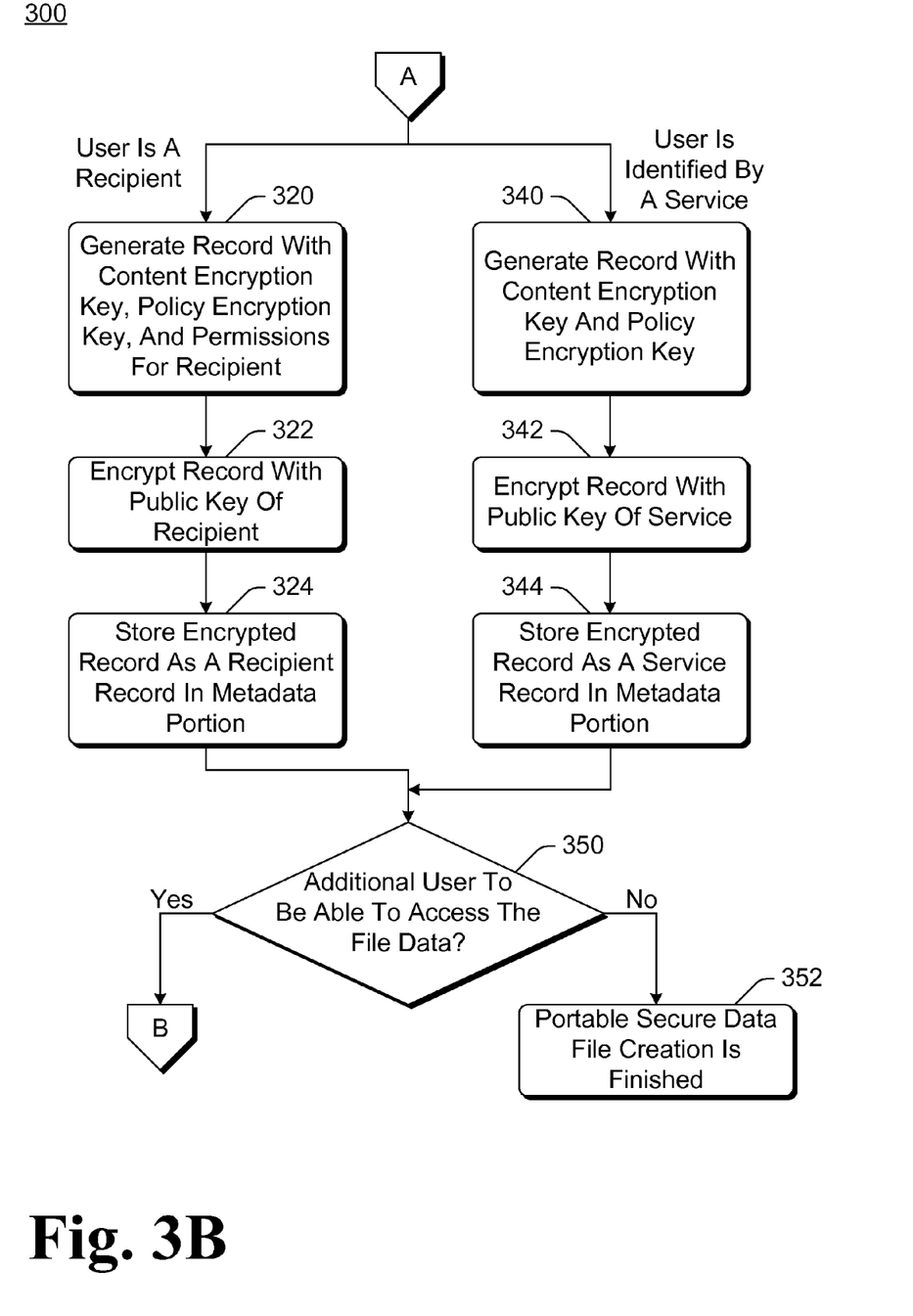

FIGS. 3A and 3B are a flowchart illustrating an example process 300 for creating a portable secure data file in accordance with one or more embodiments. Process 300 is carried out by a device, such as device 102 of FIG. 1, and can be implemented in software, firmware, hardware, or combinations thereof. Process 300 is an example process for creating a portable secure data file; additional discussions of creating a portable secure data file are included herein with reference to different figures.

In process 300, a request to create a portable secure data file is received (act 302). This request can be a request initiated by a user of the device implementing process 300, or alternatively can be initiated by another component or module of the device implementing process 300 or another device.

In response to the request, file data for the portable secure data file is obtained (act 304). The file data can be received as part of the request or alternatively can be identified in the request. For example, a link, path, or other identifier of a location of the file data can be included in the request received in act 302.

A content encryption key for the portable secure data file is also generated (act 306). This content encryption key is a shared key for use with symmetric key cryptography. The content encryption key can be generated using a variety of different well-known techniques.

The file data obtained in act 304 is then encrypted with the content encryption key generated in act 306 and stored in the data portion of the portable secure data file (act 308). The encryption in act 308 uses symmetric key cryptography and can use a variety of different well-known encryption algorithms. An identifier of the particular encryption algorithm used in act 308 (or an identifier of a decryption algorithm to be used to decrypt the file data) can also be included in the metadata portion of the portable secure data file (e.g., as part of decryption information 224 of FIG. 2).

An access control policy for the file data is also obtained (act 310). This access control policy can be obtained in a variety of different manners. In one or more embodiments, the operating system running on the device implementing process 300 has an access control policy for the current user of the device in accessing the file data. For example, this access control policy can identify whether the user has read-write access to the file data, whether the user has read-only access to the file data, and so forth. This access control policy for the current user that is used by the operating system is the access control policy that is obtained in act 310. Alternatively, this access control policy can be obtained in other manners, such as specified by the user creating the file, based on access that is permitted to other files in the folder or directory where the new portable secure data file is being created, and so forth.

A policy encryption key for the portable secure data file is also generated (act 312). This policy encryption key is a symmetric key for use with symmetric key cryptography. The policy encryption key can be generated using a variety of different well-known techniques.

The access control policy obtained in act 310 is then encrypted with the policy encryption key generated in act 312 and stored in the metadata portion of the portable secure data file (act 314). The encrypted access control policy is stored, for example, as access control policy 216 of FIG. 2. The encryption in act 314 uses symmetric key cryptography and can use a variety of different well-known encryption algorithms. The encryption algorithm used can be the same as the encryption algorithm used in act 308, or alternatively can be a different encryption algorithm. An identifier of the particular encryption algorithm used in act 314 (or an identifier of a decryption algorithm to be used to decrypt the encrypted access control policy) can also be included in the metadata portion of the portable secure data file (e.g., as part of decryption information 224 of FIG. 2).

A signature record is also stored in the metadata portion of the portable secure data file (act 316). This signature record identifies the originator of the portable secure data file as the last person to modify the file data and access control policy, and protects the file data and access control policy against unauthorized tampering as discussed above. This signature record can be, for example, signature record 218 of FIG. 2.

Additional information can also optionally be stored in the metadata portion of the portable secure data file as part of act 316 or alternatively at other times during process 300 (such as at the end of process 300). This additional information can include timestamps, an identifier of the current user of the device implementing process 300 as the user that has most recently modified the file data and/or access control policy, and so forth. This additional information can be stored, for example, as file modification record 226 of FIG. 2.

A user that is to be able to access the file data is also identified (act 318). This user can be the current user of the device implementing process 300 (e.g., the user requesting to create the portable secure data file in act 302), or alternatively one or more other users. Act 318 can be repeated multiple times in order to identify multiple users that are able to access the file data as discussed in more detail below. The user that is identified in act 318 is typically identified by the current user of the device implementing process 300. Alternatively the user identified in act 318 can be identified in other manners, such as by an administrator of the device implementing process 300, by another component or module of the device implementing process 300, and so forth.

Once the user is identified, process 300 proceeds based on the type of the identified user as shown in FIG. 3B. The type of the user can be recipient or service-identified. As discussed above, a recipient is able to access the file data based on a recipient record and/or access policy in the portable secure data file. A service-identified user is a user that is identified by a remote service as being able to access the file data as discussed above.

If the user is a recipient, then a record is generated including the following: the content encryption key generated in act 306 of FIG. 3A, the policy encryption key generated in act 312 of FIG. 3A, and permissions for the recipient (act 320). These permissions can be obtained in a variety of different manners as discussed above, such as being specified by the current user creating the portable secure data file, based on access permitted to users other than the current user to other files in the folder or directory where the new file is being created, and so forth.

The record generated in act 320 is encrypted with the public key of the recipient (act 322). The encryption in act 322 uses public key cryptography and can use a variety of different well-known encryption algorithms. The particular encryption algorithm that is used in act 322 can be inherent in the portable secure data file, so no record of the encryption algorithm may be maintained in the portable secure data file. Alternatively, an identifier of the encryption algorithm that is used in act 322 can be stored in the metadata portion of the portable secure data file.

The encrypted record resulting from act 322 is stored as a recipient record in the metadata portion of the portable secure data file (act 324). This recipient record is, for example, a recipient record 220 of FIG. 2.

If the user is identified by a service, then a record is generated including the content encryption key generated in act 306 of FIG. 3A and the policy encryption key generated in act 312 of FIG. 3A (act 340). The record generated in act 340 is encrypted with the public key of the service that identifies the user (act 342). The encryption in act 342 uses public key cryptography and can use a variety of different well-known encryption algorithms. The particular encryption algorithm that is used in act 342 can be inherent in the portable secure data file, so no record of the encryption algorithm may be maintained in the portable secure data file. Alternatively, an identifier of the encryption algorithm that is used in act 342 can be stored in the metadata portion of the portable secure data file.

The encrypted record resulting from act 342 is stored as a service record in the metadata portion of the portable secure data file (act 344). This service record is, for example, a service record 222 of FIG. 2.

After the encrypted record is stored in act 324 or act 344, a check is made as to whether there is an additional user that is to be able to access the file data (act 350). If there are one or more additional users that are to be able to access the file data and process 300 returns to act 318 of FIG. 3A where an additional user that is to be able to access the file data is identified.

However, if there are no additional users to be able to access the file data then the portable secure data file creation process is finished (act 352). It should be noted, however, that the portable secure data file created by process 300 can be subsequently modified. For example, the file data can be changed, the access control policy can be changed, a recipient record can be added or removed, a service record can be added or removed, and so forth. These modifications to the portable secure data file can be made by the originator of the portable secure data file or alternatively by another user with permission to modify the portable secure data file.

Figure 4:
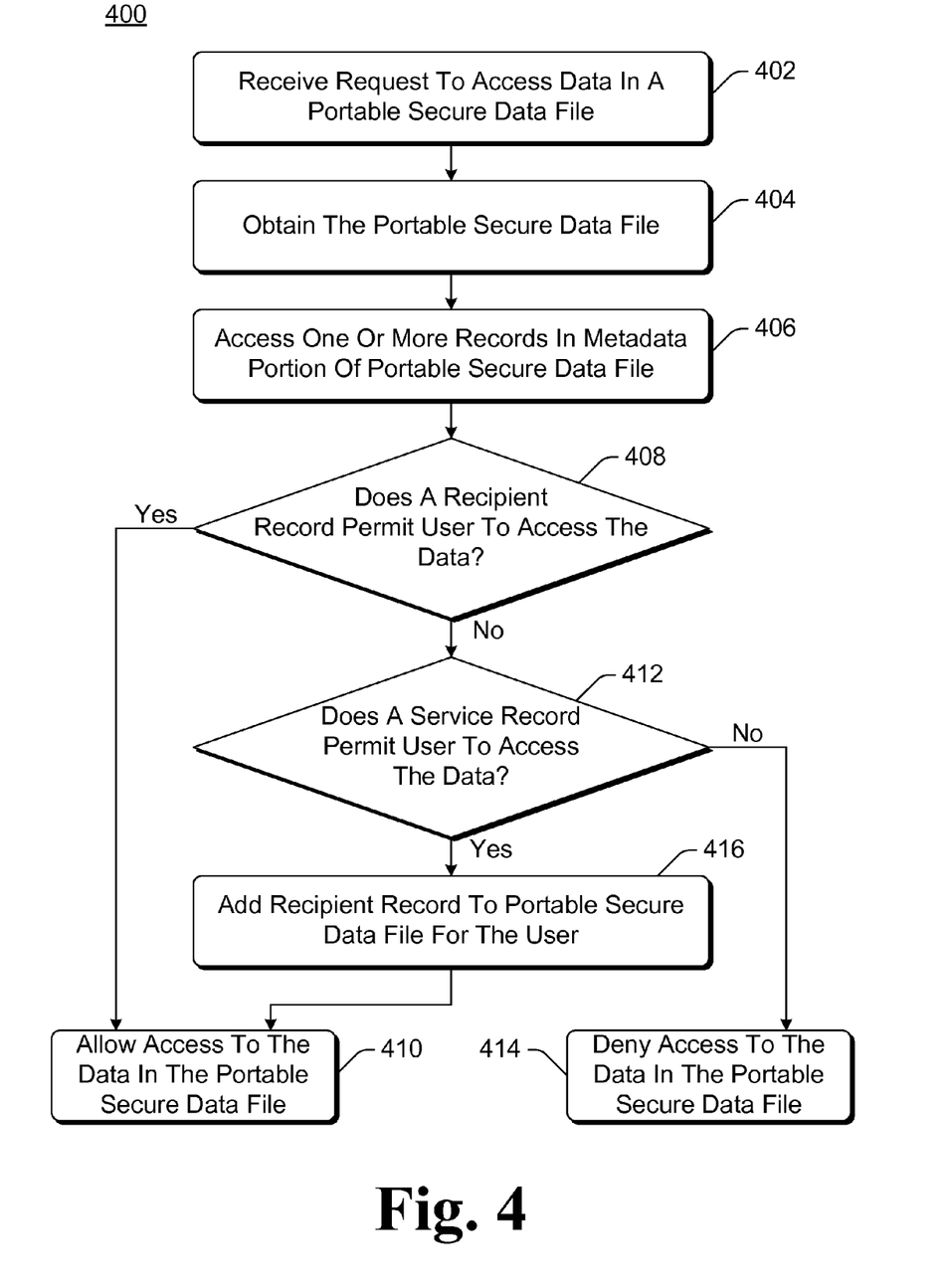
FIG. 4 is a flowchart illustrating an example process for accessing data in a portable secure data file in accordance with one or more embodiments.

FIG. 4 is a flowchart illustrating an example process 400 for accessing data in a portable secure data file in accordance with one or more embodiments. Process 400 is carried out by a device, such as device 102, 106, or 112 of FIG. 1, and can be implemented in software, firmware, hardware, or combinations thereof. Process 400 is an example process for accessing data in a portable secure data file; additional discussions of accessing data in a portable secure data file are included herein with reference to different figures.

In process 400, a request to access data in a portable secure data file is received (act 402). This request can be a request initiated by a user of the device implementing process 400, or alternatively can be initiated by another component or module of the device implementing process 400 or another device. Regardless of the initiator of the request, the request is associated with a current user of the device implementing process 400.

In response to the request, the portable secure data file is obtained (act 404) and one or more records in a metadata portion of the portable secure data file are accessed (act 406). The portable secure data file can be received as part of the request of act 402 or alternatively can be identified in the request of act 402. For example, a link, path, or other identifier of a location of the portable secure data file can be included in the request received in act 402.

A check is then made as to whether a recipient record in the portable secure data file permits the current user of the device implementing process 400 to access the file data of the portable secure data file (act 408). If such a recipient record exists, then access to the file data in the portable secure data file is allowed (act 410). The access that is allowed in act 410 is a desired access privilege that can vary based on the access control policy in the portable secure data file and access permissions of a recipient as discussed above.

However, if no such recipient record exists in act 408, then a check is made as to whether a service record in the portable secure data file permits the current user of the device implementing process 400 to access the data of the portable secure data file (act 412). This check is performed by accessing a remote service (such as encryption service 120 of FIG. 1), which returns an indication of whether the user is permitted to access the file data as discussed above.

If the remote service indicates that the user is not permitted to access the file data, then access to the file data in the portable secure data file is denied (act 414).

However, if the remote service indicates that the user is permitted to access the file data, then a recipient record for the current user of the device implementing process 400 is added to the portable secure data file (act 416). Whether a recipient record is added can be specified in different manners, as discussed above. The current user of the device implementing process 400 is also allowed to access the file data in the portable secure data file (act 410). This access that is allowed in act 410 can vary based on the access control policy in the portable secure data file as discussed above. Alternatively, act 416 may not be included in process 400, in which case access to the file data in the portable secure data file is allowed even though no recipient record is added to the portable secure data file.

Figure 5:
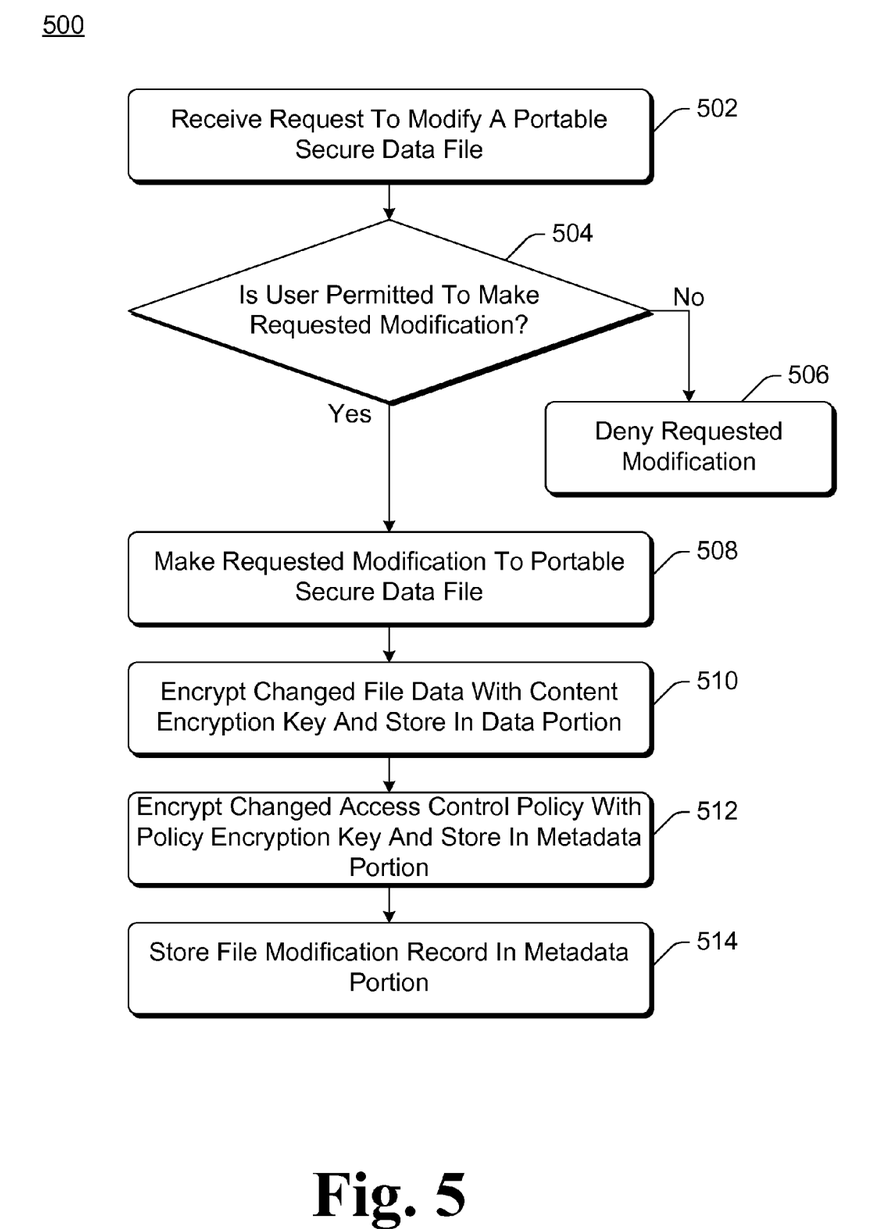
FIG. 5 is a flowchart illustrating an example process for modifying a portable secure data file in accordance with one or more embodiments.

FIG. 5 is a flowchart illustrating an example process 500 for modifying a portable secure data file in accordance with one or more embodiments. Process 500 is carried out by a device, such as computing device 102 of FIG. 1, and can be implemented in software, firmware, hardware, or combinations thereof. Process 500 is an example process for modifying a portable secure data file; additional discussions of modifying a portable secure data file are included herein with reference to different figures.

In process 500, a request to modify a portable secure data file is received (act 502). This request can be a request to modify the access control policy (e.g., policy 216 of FIG. 2) and/or a request to modify the encrypted file data (e.g., data 206 of FIG. 2). This request can be a request initiated by a user of the device implementing process 500, or alternatively can be initiated by another component or module of the device implementing process 500 or another device. Regardless of the initiator of the request, the request is associated with a current user of the device implementing process 500.

A check is then made as to whether the user is permitted to make the requested modification (act 504). Whether the user is permitted to make the requested modification is identified in the access control policy of the portable secure data file (e.g., in policy 216 of FIG. 2) and/or the permissions of a recipient record (e.g., in a record 220 of FIG. 2). If the user is not permitted to make the requested modification, then the requested modification is denied (act 506) and is not made.

However, if the user is permitted to make the requested modification, then the requested modification is made to the portable secure data file (508). If the requested modification includes modifying the file data, then the modified file data is encrypted with the content encryption key (act 510). This content encryption key is the same content encryption key as was used by the device implementing process 500 to decrypt the encrypted file data. It is to be appreciated that, if the requested modification does not include modifying the file data, then act 510 need not be performed.

If the requested modification includes modifying the access control policy, then the modified access control policy is encrypted with the policy encryption key (act 512). This policy encryption key is the same policy encryption key as was used by the device implementing process 500 to decrypt the access control policy. It is to be appreciated that, if the requested modification does not include modifying the access control policy, then act 512 need not be performed.

A file modification record is also stored in the metadata portion (act 514). This file modification record identifies the modified portable secure data file and is digitally signed by the user requesting the change as discussed above. This file modification record can be, for example, a file modification record 226 of FIG. 2.

Figure 6:
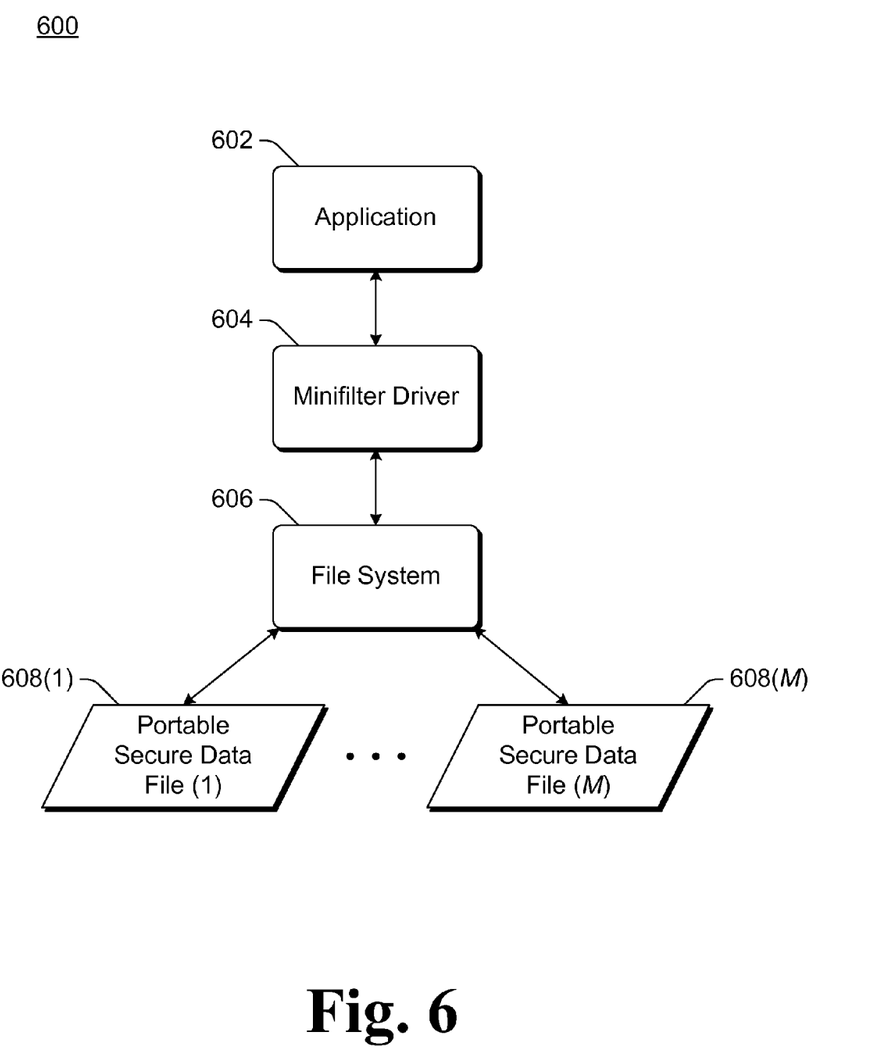
FIG. 6 illustrates an example system architecture supporting portable secure data files in accordance with one or more embodiments.

FIG. 6 illustrates an example system architecture 600 supporting portable secure data files in accordance with one or more embodiments. System architecture 600 includes an application 602, a mini filter driver 604, a file system 606, and can access multiple (M) portable secure data files 608(1 . . . M). During operation, an application 602 requests access to a particular data file 608. Application 602 may be aware that the data file is requesting access to a portable secure data file, however application 602 need not have such knowledge and typically does not have such knowledge.

The request for access to a file 608 is received by minifilter driver 604. Minifilter driver 604 operates as an intermediary between application 602 and file system 606. Minifilter driver 604 manages the creation of portable secure data files 608, the retrieval of data from portable secure data files 608, and the modification of portable secure data files 608. Accordingly, application 602 and file system 606 can access portable secure data files 608 without any special knowledge that files 608 are portable secure data files.

File system 606 manages the storage and retrieval of various files, including portable secure data files 608. When application 602 requests creation of a new file, minifilter driver 604 creates a new file (e.g., as discussed in process 300 of FIGS. 3A and 3B above) as a portable secure data file including a data portion and metadata portion as discussed above. This newly created portable secure data file is transferred to file system 606 for storage.

When application 602 requests retrieval of a portable secure data file 608, minifilter driver 604 receives the request and requests file system 606 to retrieve the requested file 608. Minifilter driver 604 determines whether the user requesting access to the requested file 608 is permitted to access the data of the requested file 608 (e.g., as discussed in process 400 of FIG. 4 above). If the user is permitted to access the file data, then the file data is decrypted and returned to application 602. However, if the user is not permitted to access the file data, then the file data is not returned to application 602.

When application 602 requests modification to a file (e.g., saving new data for the file), minifilter driver 604 receives the request and determines whether the user requesting access to the requested file 608 is permitted to modify the requested file 608 (e.g., as discussed in process 600 of FIG. 6 above). If the user is permitted to modify the file, then the file is modified as requested by application 602 and transferred to file system 606 for storage. However, if the user is not permitted to modify the file, then the file is not modified and is not transferred to file system 606 for storage.

The portable secure data files discussed herein allow for numerous usage scenarios. By way of example, if a user desires to secure a data file so that only he or she can subsequently access the data file, then a portable secure data file having a recipient record identifying the user can be created. As no other records identifying other users would be included in the metadata portion of the portable secure data file, only that user would be able to subsequently access the data file.

By way of an additional example, if a user desires to secure a data file so that he or she and one other user can subsequently access the data file, then a portable secure data file having a recipient record identifying the user and a recipient record identifying the one other user can be created. These two records would allow the user and the one other user to subsequently access to data file, but would not allow additional users to access the data file.

By way of another example if a user desires to secure a data file so that a group of users can access the data file, then a portable secure data file having a service record identifying the group of users can be created. This group of users is a group defined by the remote service associated with the service record. Accordingly, a member of the group can access the remote service and use the service record to subsequently access the data file. Furthermore, a new recipient record can be added to the portable secure data file for this member so that if this member again desires to access the data file the access can be permitted based on this recipient record without requiring access to the remote service again.

The portable secure data files discussed herein allow for various security properties. These various security properties include the following:

- A recipient or service can verify that the data identifier and originator identifier that they extract from the metadata portion have not been changed from those chosen by the originator. This verification can be performed based on the data identifier and originator identifier having been digitally signed by the originator, as discussed above.
- A recipient or service can verify that the encrypted file data has not been changed by a user lacking read-write access, and that the metadata portion has not been changed by a user who is not authorized to do so. This verification optionally involves the assistance of a remote service (e.g., when access to the data file is granted to a group via a service record and usage certificate chains are not included in file modification records, a remote service is accessed to check if the user who signed a data or metadata was a member of a group with appropriate access when the signature was generated). This verification can be performed based on the digital signatures in the file modification records 226 of FIG. 2 discussed above. If a file modification record 226 with a valid digital signature for the encrypted file data is included in metadata portion 202, then it is verified that the encrypted file data has not been changed by a user lacking read-write access, and that the metadata portion has not been changed by a user who is not authorized to do so.
- An attacker or other malicious user cannot access the plaintext of the encrypted file data. As the file data is encrypted, it is computationally infeasible for an attacker or other malicious user that is not identified in a record in the metadata portion to decrypt the file data.
- An attacker or other malicious user cannot modify the encrypted file data or the access control policy in the metadata portion without detection. For any changes made by an attacker or other malicious user, a file modification record would not be included in the portable secure data file. Accordingly, the absence of such a file modification record allows the modification by the attacker or other malicious user to be detected.

Even if an attacker or other malicious user were to attempt to modify the encrypted file data or access control policy and include a file modification record for their change, a recipient or service could detect such an attempt by using the access control policy, the digital signatures in the signature record and the contents of the file modification record (with service assistance in some cases as discussed above).

An attacker or other malicious user cannot replace the metadata portion of one file with the metadata portion of another file without detection. Such a change would change the file data identifier included in the metadata portion. Accordingly, the digital signatures in the signature record in the metadata portion would not be verified using the file data, and the replacement of the metadata portion can be detected.

When access to the data file is granted to a group of users via a service record, the access privileges granted to a user are determined based on the group membership at the time that the user requests access from the remote service. If the user is a member of the group when access is requested, the user is allowed to access the file data. However, if the user is not a member of the group when access is requested, the user is denied access to the file data.

Figure 7:
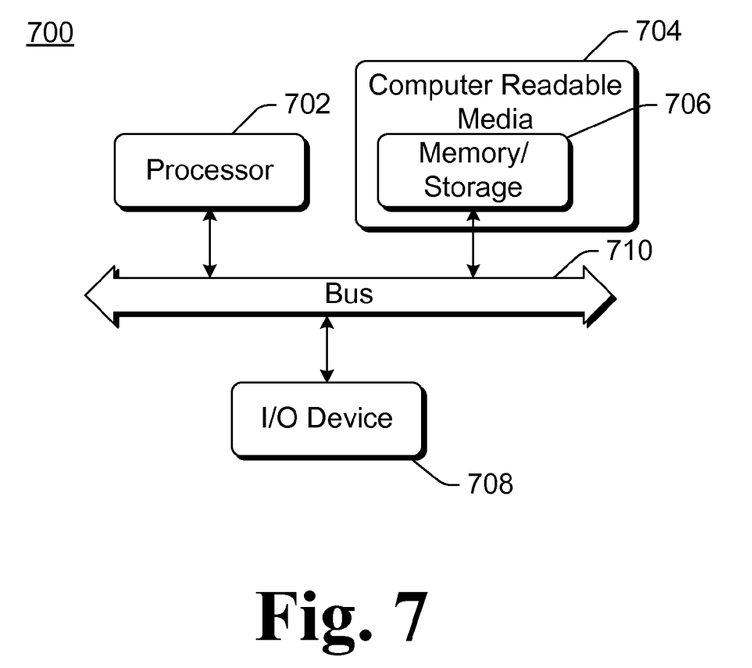
FIG. 7 illustrates an example computing device that can be configured to implement the various techniques discussed herein.

FIG. 7 illustrates an example computing device 700 that can be configured to implement the various techniques discussed herein. Computing device 700 can be, for example, device 102, 106, or 112 of FIG. 1, encryption service 120 of FIG. 1, and so forth.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or one or more I/O devices 708 can be included as part of, or alternatively may be coupled to, computing device 700. Bus 710 represents one or more of several types of bus structures, including a memory bus or memory controller, a peripheral bus, an accelerated graphics port, a processor or local bus, and so forth using a variety of different bus architectures. Bus 710 can include wired and/or wireless buses.

Memory/storage component 706 represents one or more computer storage media. Component 706 can include volatile media (such as random access memory (RAM)) and/or non-volatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 702. It is to be appreciated that different instructions can be stored in different components of computing device 700, such as in a processing unit 702, in various cache memories of a processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 7. The features of the portable secure data files techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable memory having embodied thereon:
   at least one file configured to enable secure transfer of the at least one file, the at least one file containing a metadata portion comprising:

a portable secure data file marker configured to identify the at least one file as a portable secure data file;

a portable secure data file identifier configured to distinguish the at least one file from other portable secure data files;

at least one service record including information associated with locating a remote service associated with the at least one service record, the at least one service record being encrypted to the remote service with a public key associated with the remote service; and an access control policy portion configured to indicate whether an additional record can be stored in the metadata portion of the at least one file, the additional record configured to include at least one content encryption key to be used to decrypt an encrypted data portion associated with the at least one file.

2. The one or more computer-readable memory of claim 1, wherein the encrypted data portion comprises executable instructions associated with an operating system.

3. The one or more computer-readable memory of claim 1, wherein the metadata portion includes a decryption portion configured to identify an algorithm associated with decrypting the encrypted data portion.

4. The one or more computer-readable memory of claim 1, wherein the metadata portion includes a file modification record portion configured to record modifications made to the at least one file.

5. The one or more computer-readable memory of claim 4, wherein the file modification record portion is further configured to identify each user associated with each modification recorded in the file modification record portion.

6. The one or more computer-readable memory of claim 1, wherein the access control policy portion is further configured to identify one or more types of access associated with the at least one file that one or more users are permitted to have.

7. The one or more computer-readable memory of claim 6, wherein the access control policy indicates that at least one user is permitted a different type of access than another user.

8. The one or more computer-readable memory of claim 1, wherein the at least one service record includes at least one access control policy for the remote service to enforce.

9. A device comprising:
one or more computer-readable storage memory;
one or more memory controllers configured to enable access to the one or more computer-readable storage memory; and
at least one file stored on the one or more computer-readable storage memory, the at least one file configured to enable secure transfer of the at least one file, the at least one file containing a metadata portion comprising:
a portable secure data file marker configured to identify the at least one file as a portable secure data file;
a portable secure data file identifier configured to distinguish the at least one file from other portable secure data files;
at least one service record including information associated with locating a remote service associated with the at least one service record, the at least one service record being encrypted to the remote service with a public key associated with the remote service; and
an access control policy portion configured to indicate whether an additional record can be stored in the metadata portion of the at least one file, the additional record configured to include at least one content encryption key to be used to decrypt an encrypted data portion associated with the at least one file.

10. The device of claim 9, wherein the device comprises a removable Universal Serial Bus (USB) accessible memory device.

11. The device of claim 10, wherein the encrypted file data comprises data associated with an operating system.

12. The device of claim 11, wherein the data associated with the operating system further comprises processor-executable instructions.

13. The device of claim 9, wherein the access control policy portion is further configured to identify one or more types of access associated with the at least one file that one or more users are permitted to have.

14. A computer-implemented method comprising:
obtaining, using the computer, a portable secure data file comprising an encrypted data portion and a metadata portion, the metadata portion including:
at least one service record including information associated with locating a remote service associated with the at least one service record effective to determine, at least in part, whether a user of the computer can access to the portable secure data file; and
an encrypted access control policy configured to include a policy specifying whether an additional record can be stored in the metadata portion of the at least one file, the additional record configured to include at least one content encryption key to be used to decrypt an encrypted data portion associated with the at least one file;
determining, using the computer, whether the user of the computer has access to the portable secure data file, the determining based at least in part on the encrypted access control policy or the service record; and
responsive to determining the user of the computer has access to the portable secure data file, enabling, using the computer, access to the portable secure data file.

15. The method of claim 14, wherein enabling access comprises enabling read-write access.

16. The method of claim 14, wherein enabling access to the portable secure data file further comprises decrypting the encrypted data portion.

17. The method of claim 16, wherein the metadata portion includes a decryption portion configured to identify an algorithm associated with decrypting the encrypted data portion; and
wherein decrypting the encrypted data portion is based, at least in part, on the algorithm identified in the decryption portion.

18. The method of claim 14, wherein enabling access further comprises:
modifying, using the computer, the encrypted data portion associated with the portable secure data file; and
encrypting, using the computer, at least part of said modified portable secure data file.

19. The method of claim 18, wherein encrypting at least part of said modified portable secure data file utilizes a same content encryption key utilized to encrypt, at least part of, the unmodified portable secure data file.

20. The method of claim 14, wherein enabling access further comprises:
modifying, using the computer, the access control policy; and
encrypting, using the computer, the modified access control policy utilizing a policy encryption key, the policy encryption key being a same policy encryption key utilized to encrypt, at least part of, the unmodified portable secure data file.

* * * * *